(12) United States Patent
Fujiyama et al.

(10) Patent No.: US 10,142,054 B2
(45) Date of Patent: Nov. 27, 2018

(54) TRANSMISSION APPARATUS, CONTROL METHOD, AND PROGRAM

(71) Applicant: NEC Corporation, Tokyo (JP)

(72) Inventors: Kenichiro Fujiyama, Tokyo (JP); Koji Kida, Tokyo (JP)

(73) Assignee: NEC Corporation, Tokyo (JP)

(*) Notice: Subject to any disclaimer, the term of this patent is extended or adjusted under 35 U.S.C. 154(b) by 40 days.

(21) Appl. No.: 15/036,887

(22) PCT Filed: Jul. 3, 2014

(86) PCT No.: PCT/JP2014/067749
§ 371 (c)(1),
(2) Date: May 16, 2016

(87) PCT Pub. No.: WO2015/072174
PCT Pub. Date: May 21, 2015

(65) Prior Publication Data
US 2016/0301497 A1   Oct. 13, 2016

(30) Foreign Application Priority Data
Nov. 18, 2013  (JP) ................................ 2013-237599

(51) Int. Cl.
*H04L 1/00* (2006.01)
*H04L 1/18* (2006.01)
(Continued)

(52) U.S. Cl.
CPC .......... *H04L 1/0041* (2013.01); *H04L 1/0026* (2013.01); *H04L 1/1819* (2013.01);
(Continued)

(58) Field of Classification Search
CPC ... H04L 1/0009; H04L 1/0026; H04L 5/0007; H04L 5/0057; H04L 5/006; H04L 1/20; H04L 1/0003; H04L 1/0045
(Continued)

(56) References Cited

U.S. PATENT DOCUMENTS 7,418,249 B2 * 8/2008 Matsumura ......... H04L 25/0262
375/225
8,422,449 B2 * 4/2013 Choi .................... H04B 7/0452
370/329

(Continued)

FOREIGN PATENT DOCUMENTS

JP   2003-023503 A   1/2003
JP   2003-179536 A   6/2003
(Continued)

OTHER PUBLICATIONS

International Search Reporting corresponding to PCT/JP2014/067749, dated Sep. 2, 2014, 1 page.
(Continued)

*Primary Examiner* — James C Kerveros
(74) *Attorney, Agent, or Firm* — Wilmer Cutler Pickering Hale and Dorr LLP

(57) ABSTRACT

A communication unit (2020) performs directly wireless communicates with a portable terminal (3000). A collection information acquisition unit (2040) acquires collection information. A division transmission unit (2060) generates multiple pieces of partial collection information by dividing the collection information, and transmits pieces of partial collection information being different from each other to multiple portable terminals (3000). A redundancy transmission unit (2080) transmits the same collection information to the multiple portable terminals (3000). An index value acquisition unit (2100) acquires any one or two of a reliability index value and a capacity index value of the portable (Continued)

terminal (3000). Based on any one or two of the reliability index value and the capacity index value of each portable terminal (3000), a transmission control unit (2120) selects the division transmission unit (2060) or the redundancy transmission unit (2080) to perform the transmission.

22 Claims, 8 Drawing Sheets

(51) Int. Cl.
  *H04L 1/22* (2006.01)
  *H04W 4/80* (2018.01)
  *H04W 4/00* (2018.01)
  *H04W 84/18* (2009.01)
  *H04L 1/20* (2006.01)
(52) U.S. Cl.
  CPC ............... *H04L 1/20* (2013.01); *H04L 1/22* (2013.01); *H04W 4/00* (2013.01); *H04W 4/80* (2018.02); *H04L 1/0003* (2013.01); *H04W 84/18* (2013.01)
(58) Field of Classification Search
  USPC ........................................................ 714/776
  See application file for complete search history.

(56) References Cited

U.S. PATENT DOCUMENTS

| | | | | |
|---|---|---|---|---|
| 8,429,506 B2* | 4/2013 | Kotecha | ................ | H04L 1/0029 370/329 |
| 8,532,051 B2* | 9/2013 | Prasad | ................. | H04L 1/0025 370/330 |
| 8,599,751 B2* | 12/2013 | Clerckx | ................ | H04B 7/022 370/328 |
| 8,687,582 B2* | 4/2014 | Qin | ......................... | H04L 5/001 370/312 |
| 8,737,508 B2* | 5/2014 | Kim | ..................... | H04B 7/0632 370/312 |
| 8,917,665 B2* | 12/2014 | Seo | ....................... | H04L 1/0026 370/328 |
| 8,964,651 B2* | 2/2015 | Stamoulis | ............. | H04W 28/12 370/329 |
| 9,036,608 B2* | 5/2015 | Chen | .................... | H04B 7/0689 370/310.2 |
| 2001/0053142 A1* | 12/2001 | Abe | ...................... | H04L 1/0041 370/337 |
| 2009/0067424 A1* | 3/2009 | Zhang | .................. | H04L 1/0057 370/389 |

FOREIGN PATENT DOCUMENTS

| | | |
|---|---|---|
| JP | 2006-013982 A | 1/2006 |
| JP | 2006-333335 A | 12/2006 |
| JP | 2007-084191 A | 4/2007 |
| JP | 2007-151006 A | 6/2007 |
| JP | 2010-093387 A | 4/2010 |
| JP | 2012-105010 A | 5/2012 |
| WO | WO-2013/096020 A1 | 6/2013 |

OTHER PUBLICATIONS

Decision to Grant Patent issued by the Japan Patent Office for Japanese Application No. 2015-547653 dated Aug. 7, 2018 (4 pages).

* cited by examiner

TRANSMISSION APPARATUS, CONTROL METHOD, AND PROGRAM

CROSS-REFERENCE TO RELATED APPLICATIONS

This application is a national stage application of International Application No. PCT/JP2014/067749 entitled "TRANSMISSION APPARATUS, CONTROL METHOD, AND PROGRAM," filed on Jul. 3, 2014, which claims the benefit of the priority of Japanese Patent Application No. 2013-237599 filed on Nov. 18, 2013, the disclosures of each of which are hereby incorporated by reference in their entirety.

TECHNICAL FIELD

The present invention relates to a transmission apparatus, a control method, and a program.

BACKGROUND ART

In some systems, a server collects information from apparatuses that are targets for information collection, and these apparatuses are managed using the pieces of the collected information. For example, in order to reduce a loss of sales opportunities, a management system collects inventory information from vending machines, and thus detects an out-of-stock condition in a vending machine, predicts a time when the vending machine becomes an out-of-stock condition, and so forth. Furthermore, for example, a management system for propane gas collects information relating to the amount of remaining gas from a gas cylinder of propane gas in order to efficiently perform a job of delivering the propane gas.

Patent Documents 1 to 4 are considered as examples of documents that disclose technologies relating to the information collection. Patent Document 1 discloses a technology for collecting sales information of vending machines through a personal handy-phone system (PHS) link. An apparatus that performs PHS communication is provided in each vending machine. Then, each vending machine performs the PHS communication and transmits information to the center.

Patent Document 2 discloses a technology for collecting maintenance information of an elevator using a wireless IC tag. Specifically, the elevator has a function of transmitting the maintenance information from the wireless IC tag, and the wireless IC tag is read using a dedicated portable terminal that includes a wireless IC tag reader. Thus, the maintenance information is collected from the elevator. Then, the information collected by the portable terminal is transferred to a portable terminal that is present in an office in which an operator works.

Patent Document 3 discloses a communication system that transmits information transmitted by a portable terminal with a low-level function, to a base station through a portable terminal with high-level function. The portable terminal with the high-level function has an authentication function in which control is performed in such a manner as to relay only information transmitted from the portable terminal with the low-level function that has a predetermined telephone number.

Patent Document 4 discloses a system that transmits data using multiple channels when data is transmitted from a base station to a terminal station. As one method, there is a method in which data is divided and pieces of data that are different from each other are transmitted using two channels. Furthermore, as another method, there is a method in which a base station transmits the same data using two channels.

RELATED DOCUMENT

Patent Document

[Patent Document 1] Japanese Unexamined Patent Application Publication No. 2003-023503
[Patent Document 2] Japanese Unexamined Patent Application Publication No. 2007-084191
[Patent Document 3] Japanese Unexamined Patent Application Publication No. 2007-151006
[Patent Document 4] Japanese Unexamined Patent Application Publication No. 2006-013982

SUMMARY OF THE INVENTION

In some cases, a transmission apparatus, which transmits information collected from a target apparatus to a server, transmits the information to the server through multiple portable terminals that are able to perform short-distance wireless communication with the transmission apparatus. By using this method, the transmission apparatus does not need to have a function of performing a wide area wireless communication.

The inventor studied a method in which information is efficiently transmitted when a transmission apparatus transmits information to a server through multiple portable terminals. Patent Documents 1 to 4 make no mention of a case where wireless communication is performed via multiple portable terminals.

The present invention is made in view of the problems described above. An object of the present invention is to provide a technology with which information transmission is performed efficiently when a transmission apparatus transmits information to a server through multiple portable terminals.

A transmission apparatus that is provided according to the present invention transmits collection information to a collection apparatus through multiple portable terminals. The transmission apparatus includes: a communication unit performing directly wireless communication with a portable terminal; a collection information acquisition unit acquiring the collection information; a division transmission unit generating multiple pieces of partial collection information by dividing the collection information, and transmitting pieces of partial collection information being different from each other to the multiple portable terminals using the communication unit; a redundancy transmission unit transmitting a same collection information to the multiple portable terminals using the communication unit; an index value acquisition unit acquiring any one or two of a reliability index value and a capacity index value for the portable terminal, the reliability index value indicating reliability of communication being performed between the portable terminal and the transmission apparatus, the capacity index value indicating capacity of the portable terminal; and a transmission control unit selecting either of the division transmission unit or the redundancy transmission unit, based on any one or two of the reliability index value and the capacity index value of the portable terminal, and causing the selected unit to perform the transmission of the collection information.

A control method that is provided according to the present invention is performed by a computer that transmits collection information to a collection apparatus through multiple portable terminals. The computer includes a communication unit that performs directly wireless communication with the portable terminal. The control method includes: a collection information acquisition step of acquiring the collection information; a division transmission step of generating multiple pieces of partial collection information by dividing the collection information, and transmitting pieces of partial collection information being different from each other to the multiple portable terminals using the communication unit; a redundancy transmission step of transmitting a same collection information to the multiple portable terminals using the communication unit; an index value acquisition step of acquiring any one or two of a reliability index value and a capacity index value for the portable terminal, the reliability index value indicating reliability of communication being performed between the portable terminal and the transmission apparatus, the capacity index value indicating capacity of the portable terminal; and a transmission control step of selecting either of the division transmission step or the redundancy transmission step, based on any one or two of the reliability index value and the capacity index value of the portable terminal, and causing the selected step to be performed on the collection information.

A program that is provided according to the present invention causes a computer to have a function of operating as a transmission apparatus that is provided according to the present invention. The computer includes a communication unit that performs directly wireless communication with the portable terminal. The program causes the computer to have a function that each functional constituent unit of the transmission apparatus that is provided according to the present invention has.

According to the present invention, a technology is provided that efficiently performs information transmission when a transmission apparatus transmits information to a server through multiple portable terminals.

BRIEF DESCRIPTION OF THE DRAWINGS

The objects described above, and other objects, features and advantages are further made more apparent by suitable embodiments that will be described below and the following accompanying drawings.

DESCRIPTION OF EMBODIMENTS

Figure 1:
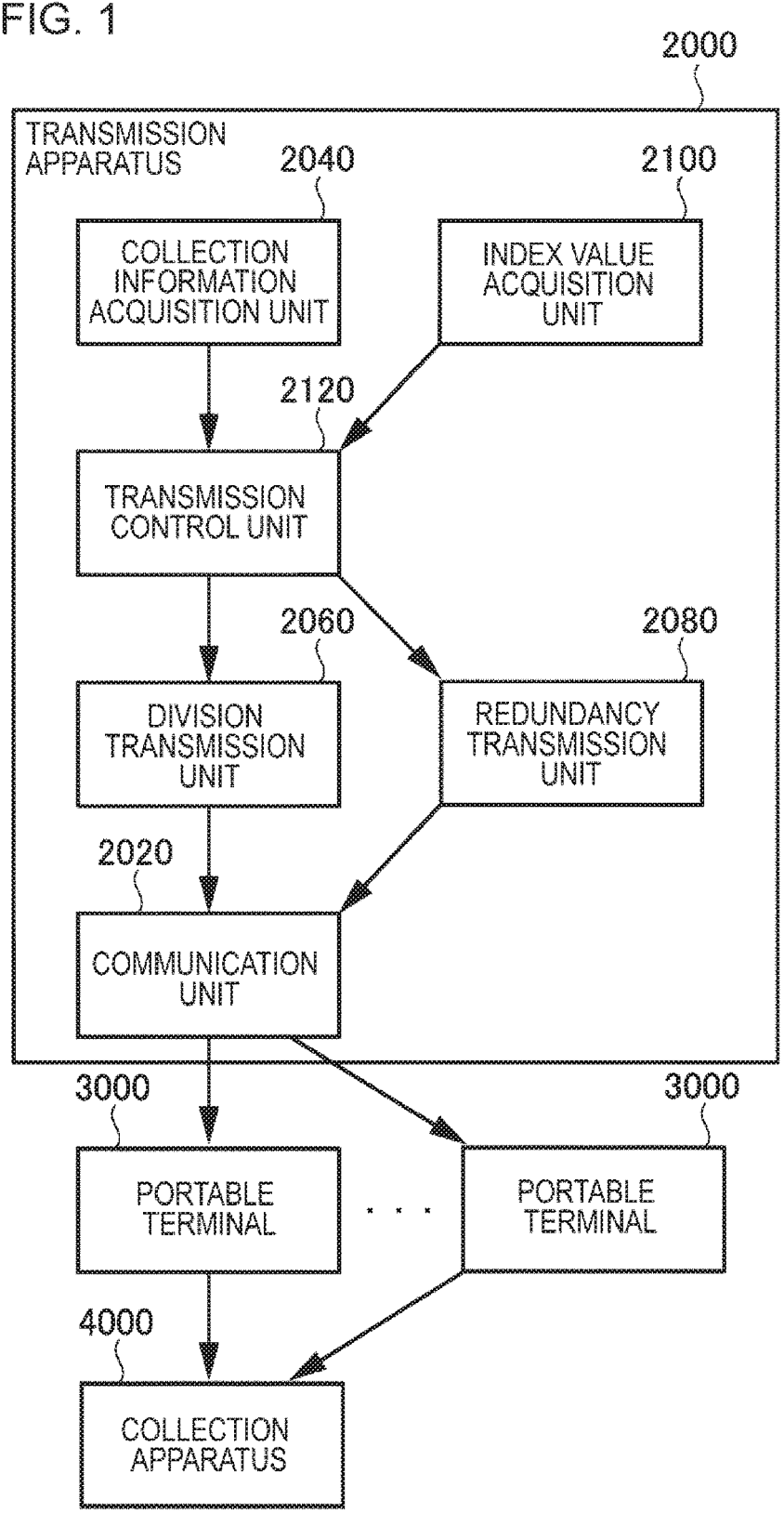
FIG. 1 is a block diagram illustrating a transmission apparatus according to a first embodiment, along with an operating environment thereof.

Embodiments of the present invention will be described below referring to the drawings. Moreover, in all the drawings, the same constituent elements are the same reference numerals, and descriptions thereof are suitably omitted.

First Embodiment

<Outline>

FIG. 1 is a block diagram illustrating a transmission apparatus 2000 according to a first embodiment, along with an operating environment thereof. In FIG. 1, a flow of arrows indicates a flow of information. Furthermore, in FIG. 1, each block illustrates a configuration in terms of a functional unit, not a configuration in terms of a hardware unit.

The transmission apparatus 2000 acquires collection information and transmits the collection information to a collection apparatus 4000 through multiple portable terminals 3000. The collection information is information relating to an apparatus being a target for information collection (hereinafter referred to as a "target apparatus"). The target apparatus is the transmission apparatus 200 or an apparatus being monitored by the transmission apparatus 2000. When the target apparatus is an apparatus other than the transmission apparatus 2000, the transmission apparatus 2000, for example, is provided inside of or outside of a housing of the target apparatus. In addition to this, for example, the transmission apparatus 2000 may be provided in the vicinity of the target apparatus.

The target apparatus is, for example, a vending machine or a gas cylinder of propane gas. The collection information is, for example, information necessary for maintenance of the target apparatus. For example, when the target apparatus is a vending machine, the collection information is inventory information of the vending machine, or the like. For example, when the target apparatus is the gas cylinder, the collection information is the amount of remaining gas in the gay cylinder, or the like.

For example, portable terminal 3000 is a cellar phone, a tablet PC, or the like. The portable terminal 3000 may be an unspecified portable terminal from the perspective of the transmission apparatus 2000. The unspecified portable terminal is, for example, a portable terminal used by an ordinary person, which has no direct relation with a company performing operation or management of the transmission apparatus 2000. When the apparatus that is a target for monitoring is a vending machine, the unspecified portable terminal is, for example, a cellar phone used by an ordinary person who purchases an item from the vending machine. However, portable terminal 3000 may be a specific portable terminal from the perspective of the transmission apparatus 2000. The specific portable terminal is, for example, a portable terminal used by a person who is in charge of collecting information, and who is employed by a company or the like performing the operation or the management of the transmission apparatus 2000.

The collection apparatus 4000 acquires the collection information acquired by the transmission apparatus 2000, through the portable terminal 3000. For example, the collection apparatus 4000 is a database in which the collection information is stored. For example, the collection apparatus 4000 is an apparatus that analyzes the collection information.

The transmission apparatus 2000 has a communication unit 2020, a collection information acquisition unit 2040, a division transmission unit 2060, a redundancy transmission unit 2080, an index value acquisition unit 2100, and a transmission control unit 2120. These will be individually described below.

<<Communication Unit 2020>>

The communication unit 2020 performs directly wireless communication with the portable terminal 3000.

<<Collection Information Acquisition Unit 2040>>

The collection information acquisition unit 2040 acquires the collection information.

<<Division Transmission Unit 2060>>

The division transmission unit 2060 divides the collection information, and thus generates multiple pieces of partial collection information. Additionally, the division transmission unit 2060 transmits the pieces of partial collection information that are different from each other to multiple portable terminals 3000 using the communication unit 2020.

<<Redundancy Transmission Unit 2080>>

The redundancy transmission unit 2080 transmits the same collection information to the multiple portable terminals 3000 using the communication unit 2020.

<<Index Value Acquisition Unit 2100>>

The index value acquisition unit 2100 acquires any one or two of a reliability index value and a capacity index value for the portable terminal 3000. Note that, the reliability index value for the portable terminal 3000 indicates reliability of communication performed between the portable terminal 3000 and the transmission apparatus 2000. Furthermore, the capacity index value for portable terminal 3000 indicates capacity of the portable terminal 3000.

<<Transmission Control Unit 2120>>

Based on any one or two of the reliability index value and the capacity index value for each portable terminal 3000, the transmission control unit 2120 selects either of the division transmission unit 2060 and the redundancy transmission unit 2080, and causes the selected one to perform the transmission of the collection information.

<Advantageous Effect>

The division of the collection information for transmission (hereinafter referred to as division transmission) has, for example, the following merits. First, different pieces of partial collection information can be transmitted to each portable terminal 3000 in parallel. Thus, the time being required for the collection apparatus 4000 to acquire the collection information is shortened. Furthermore, another merit is that required capacity of each portable terminal 3000 may decrease because the amount of information transmitted to each portable terminal 3000 decreases.

Furthermore, the transmission of the same collection information to the multiple portable terminals 3000 in a redundant manner (hereinafter referred to as redundancy transmission) has, for example, the following merits. It is sufficient for the collection apparatus 4000 to be able to acquire the collection information from any one portable terminal 3000 of the multiple portable terminals 3000. Thus, a probability that the collection apparatus 4000 can successfully acquire the collection information increases, even if reliability of the portable terminal 3000 is low. In a case where the collection apparatus 4000 cannot correctly acquire the collection information, the transmission apparatus 2000 needs, for example, to take a measure such as "re-transmitting the same collection information to the collection apparatus 4000". As a result, the transmission of the collection information becomes inefficient. If the redundancy transmission is performed using the redundancy transmission unit 2080, it can be prevented from that the collection information is transmitted inefficiently like above.

As described above, the division transmission and the redundancy transmission have different merits according to the reliability or the capacity of the portable terminal 3000. Based on anyone or two of the reliability index value and the capacity index value of the portable terminal 3000, the transmission apparatus 2000 according to the present embodiment performs the transmission of the collection information using anyone of the division transmission unit 2060 and the redundancy transmission unit 2080. By doing so, a transmission method having greater merits can be selected from the division transmission and the redundancy transmission for transmitting the collection information. Therefore, when the transmission apparatus 2000 transmits the collection information to the collection apparatus 4000 through the multiple portable terminals 3000, the collection information can be efficiently transmitted.

<Hardware Configuration>

Each functional constituent unit that is included in the transmission apparatus 2000, is realized as at least one hardware constituent element, individually or in a state of a combination of multiple functional units. In addition to this, for example, each functional constituent unit is realized as at least one software constituent element. In addition to this, for example, each functional constituent unit is realized as a combination of a hardware constituent element and a software constituent element.

Figure 2:
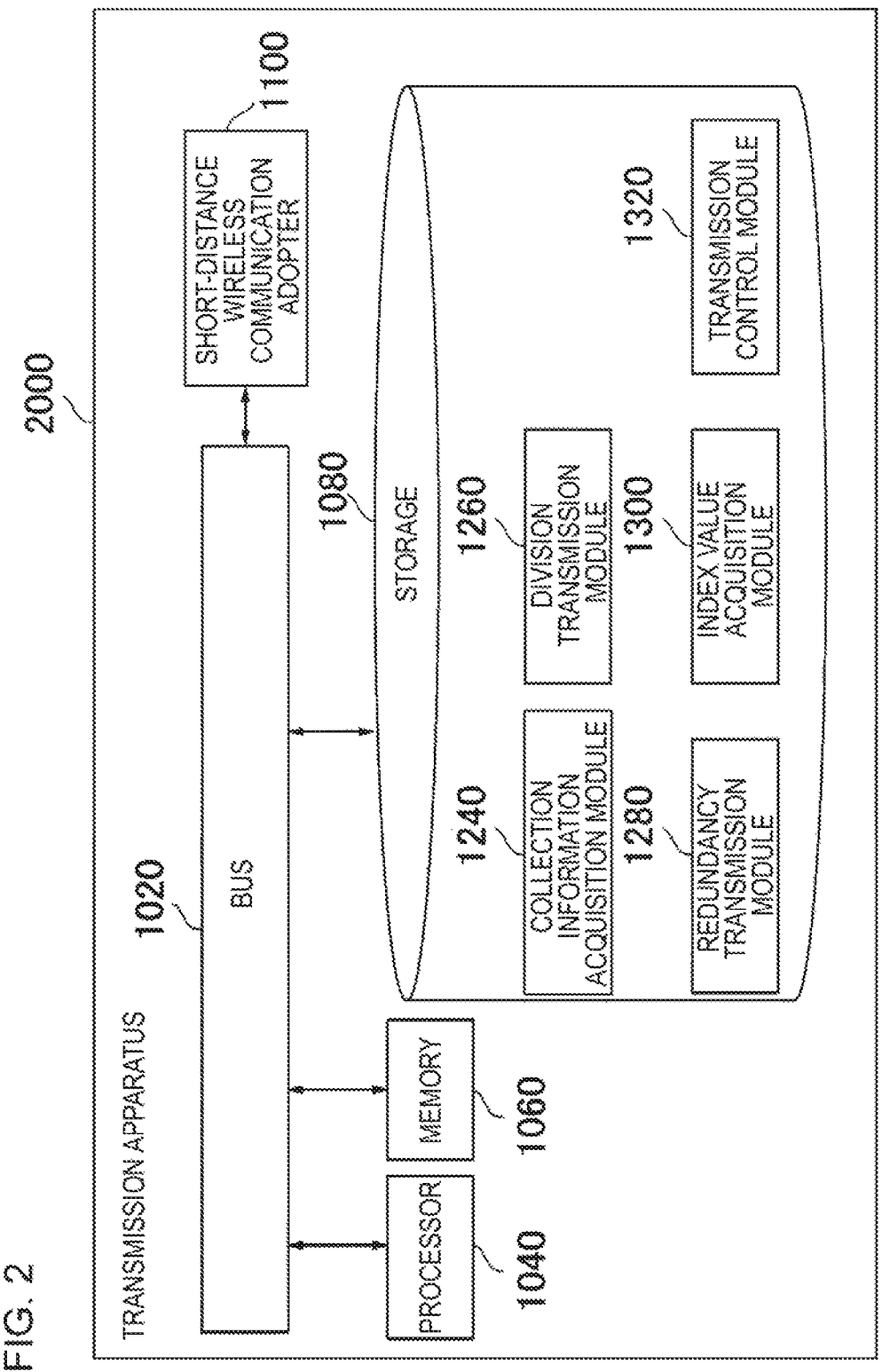
FIG. 2 is a block diagram illustrating a hardware configuration of the transmission apparatus.

FIG. 2 is a block diagram illustrating a hardware configuration of the transmission apparatus 2000. In FIG. 2, the transmission apparatus 2000 includes a bus 1020, a processor 1040, a memory 1060, storage 1080, and a short-distance wireless communication adapter 1100.

The bus 1020 is a data channel for the processor 1040, the memory 1060, the storage 1080, and the short-distance wireless communication adapter 1100 to transmit and receive data mutually. The processor 1040 is, for example, is an arithmetic processing unit such as a central processing unit (CPU) or a graphics processing unit (GPU). The memory 1060 is, for example, a memory, such as a random access memory (RAM) or a read only memory (ROM). The storage 1080 is, for example, a storage device, such as a memory card, a hard disk, or a solid state drive (SSD). Furthermore, the storage 1080 may be a memory, such as a RAM or a ROM. The short-distance wireless communication adapter 1100 is a network adapter that has a function of performing short-distance wireless communication. The short-distance wireless communication adapter 1100 realizes a function of the communication unit 2020.

A collection information acquisition module 1240 is a program for causing the transmission apparatus 2000 to function as the collection information acquisition unit 2040. The processor 1040 executes the collection information acquisition module 1240 and thus realizes a function of the collection information acquisition unit 2040.

The division transmission module 1260 is a program for causing the transmission apparatus 2000 to function as the division transmission unit 2060. The processor 1040 executes the division transmission module 1260 and thus realizes a function of the division transmission unit 2060.

The redundancy transmission module 1280 is a program for causing the transmission apparatus 2000 to function as the redundancy transmission unit 2080. The processor 1040 executes the redundancy transmission module 1280 and thus realizes the redundancy transmission unit 2080.

An index value acquisition module 1300 is a program for causing the transmission apparatus 2000 to function as the index value acquisition unit 2100. The processor 1040 executes the index value acquisition module 1300 and thus realizes a function of the index value acquisition unit 2100.

The transmission control module 1320 is a program for causing the transmission apparatus 2000 to function as the transmission control unit 2120. The processor 1040 executes the transmission control module 1320 and thus realizes a function of the transmission control unit 2120.

For example, the processor 1040 reads each of the modules into the memory 1060 for execution. However, the processor 1040 may execute each of the modules without being read into the memory 1060.

Each of the modules is stored in the storage 1080.

The hardware configuration of the transmission apparatus 2000 is not limited to the configuration that is illustrated in FIG. 2. For example, each module may be stored in the memory 1060. In this case, the transmission apparatus 2000 may not include the storage 1080.

<Flow for Processing>

Figure 3:
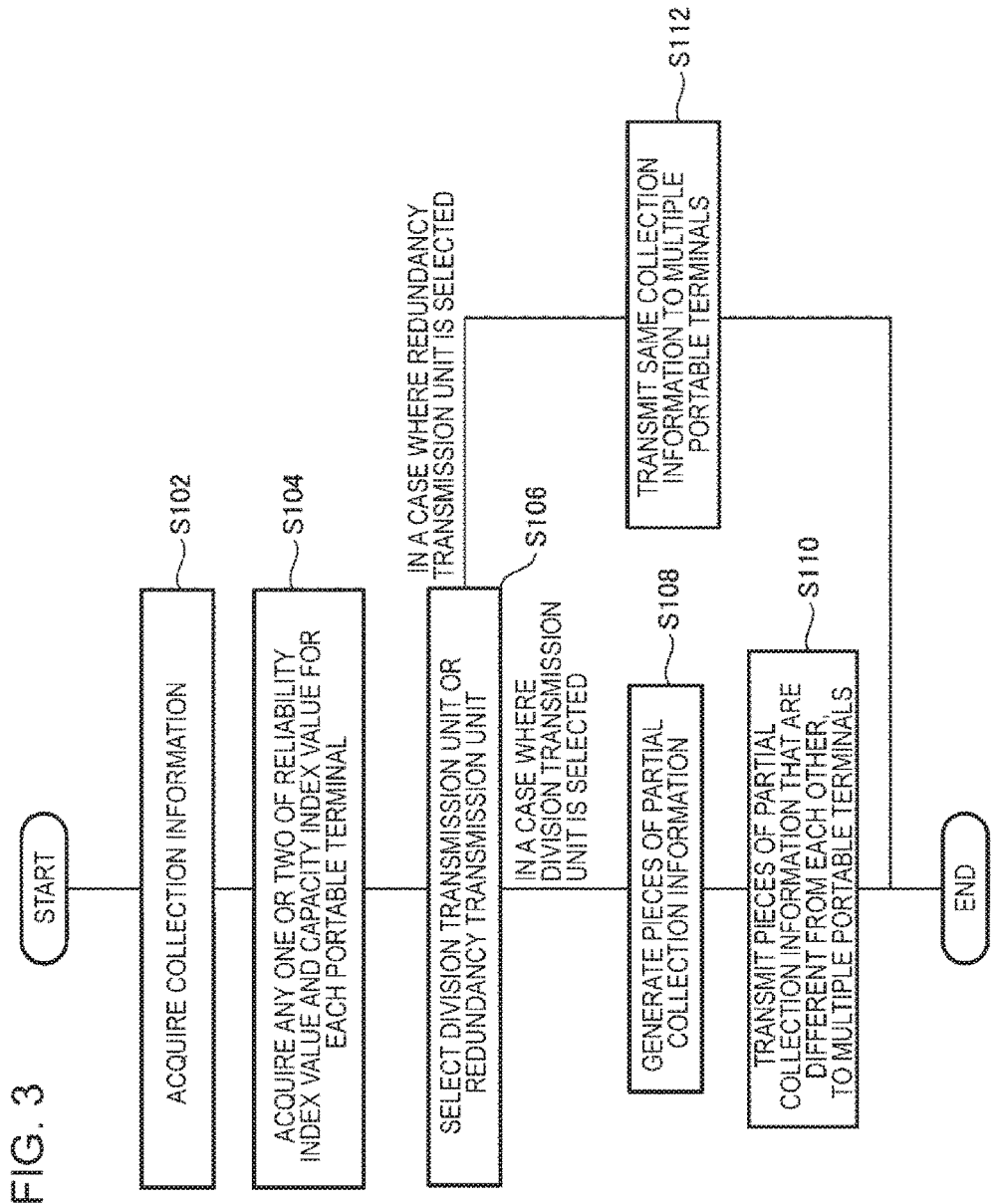
FIG. 3 is a flowchart illustrating a flow of processes performed by the transmission apparatus according to the first embodiment.

FIG. 3 is a flowchart illustrating a flow of processing performed by the transmission apparatus 2000 according to the first embodiment. In Step S102, the collection information acquisition unit 2040 acquires the collection information. In Step S104, the index value acquisition unit 2100 indicates any one or two of the reliability index value and the capacity index value to each portable terminal 3000. In Step S106, based on any one or two of the reliability index value and the capacity index value of each of the portable terminal 3000, the transmission control unit 2120 selects any one of the division transmission unit 2060 and the redundancy transmission unit 2080. In a case where the division transmission unit 2060 is selected, processing in FIG. 3 proceeds to Step S108. On the other hand, in a case where the redundancy transmission unit 2080 is selected, the processing in FIG. 3 proceeds to Step S112.

In Step S108, the division transmission unit 2060 divides the collection information, and thus generates pieces of partial collection information. In Step S110, the division transmission unit 2060 transmits different pieces of partial collection information to the multiple portable terminals 3000 using the communication unit 2020.

In Step S112, the redundancy transmission unit 2080 transmits the same collection information to the multiple portable terminals 3000 using the communication unit 2020.

The present embodiment will be described in more detail below.

<Details of a Communication Method>

As described above, the communication unit 2020 performs the directly wireless communication with the portable terminal 3000. Specifically, the communication unit 2020 performs the communication with the portable terminal 3000 through a short-distance wireless link. Furthermore, the portable terminal 3000 transmits the collection information to the collection apparatus 4000 through a wide-area wireless link.

The short distance wireless link that connects the transmission apparatus 2000 and the portable terminal 3000 is, for example, a wireless link for communicating in accordance with a communication standard, such as wireless LAN represented by Wireless Fidelity (Wi-Fi), Bluetooth (a registered trademark), or ZigBee. Furthermore, the transmission apparatus 2000 and portable terminal 3000 may communicate with each other using infrared communication or RFID.

The wide area wireless link that connects the portable terminal 3000 and the collection apparatus 4000 is, for example, a wireless link for communicating in accordance with a communication standard, such as a personal handy-phone system (PHS), 3rd generation (3G), worldwide interoperability for microwave access (WiMAX), long term evolution (LTE), or the like.

<Method of Acquiring the Collection Information>

There are various methods for the collection information acquisition unit 2040 to collect the collection information. For example, the collection information acquisition unit 2040 acquires the collection information stored in the target apparatus. Furthermore, for example, the collection information acquisition unit 2040 may acquire the collection information generated in the transmission apparatus 2000.

The collection information acquisition unit 2040 may acquire the collection information periodically and may acquire the collection information aperiodically. In a case where the collection information acquisition unit 2040 generates the collection information aperiodically, the collection information acquisition unit 2040 acquires the collection information when, for example, an event like an occurrence of failure takes place in the target apparatus.

<Details of the Reliability Index Value>

For example, the reliability index value of that portable terminal 3000 indicates a higher value as radio wave intensity between the portable terminal 3000 and the transmission apparatus 2000 is higher. The reliability index value may be represented by the radio wave intensity, or may be a different value that indirectly indicates the radio wave intensity.

In another case, for example, the reliability index value of the portable terminal 3000 may be a value that is based on a situation of when the communication with that portable terminal 3000 was performed in the past. For example, in a case where incorrect transfer of the collection information was frequently occurred due to data losses when the collection information was transmitted to the portable terminal 3000, the reliability index value of that portable terminal 3000 becomes a lower value. On the other hand, in a case where correct transfer of the collection information was frequently occurred when the collection information was transmitted to the portable terminal 3000, the reliability index value of that portable terminal 3000 becomes a higher value.

In this manner, when the reliability index value is determined based on the situation of the communication with the portable terminal 3000 having been performed in the past, for example, a storage unit is provided inside of or outside of the transmission apparatus 2000. The storage unit stores a probability of correct transfer of the information having been performed through the communication with the portable terminal 3000. The index value acquisition unit 2100 uses this probability as the reliability index value of the portable terminal 3000.

Furthermore, for example, the reliability index value may be a value that is set by a user of the portable terminal 3000.

<Details of the Capacity Index Value>

The capacity index value of the portable terminal 3000 indicates the capacity of the portable terminal 3000, which relates to the communication performed between that portable terminal 3000 and the transmission apparatus 2000. For example, the capacity index value of that portable terminal 3000 indicates a higher value as a communication speed between the portable terminal 3000 and the transmission apparatus 2000 is higher. In this case, the capacity index value may be represented by the communication speed, or may be a different value that indirectly indicates the communication speed.

Furthermore, for example, the capacity index value of that portable terminal 3000 indicates a higher value as the amount of information that the portable terminal 3000 can receive from the transmission apparatus 2000 (hereinafter referred to as the capable amount of information) is greater. In this case, the capacity index value may be represented by the capable amount of information, and may be a different value that indirectly indicates the capable amount of permitted information. For example, the capable amount of information is a size of a receive buffer that the portable terminal 3000 has.

Furthermore, for example, the capacity index value may be a value that is set by the user of the portable terminal 3000.

Second Embodiment

A transmission apparatus 2000 according to a second embodiment is illustrated in FIG. 1 in the same manner as the transmission apparatus 2000 according to the first embodiment.

The index value acquisition unit 2100 according to the second embodiment acquires the reliability index value of the portable terminal 3000. The transmission control unit 2120 according to the second embodiment selects either one of the division transmission unit 2060 and the redundancy transmission unit 2080 based on the number of the portable terminals 3000 that satisfy a first condition: "the reliability index value is equal to or greater than first reliability degree".

In a case where the number of the portable terminals 3000 that satisfy the first condition is a first predetermined number or greater, the transmission control unit 2120 selects the division transmission unit 2060. The division transmission unit 2060 transmits the partial collection information to the multiple portable terminals 3000 that satisfy the first condition.

On the other hand, in a case where the number of the portable terminals 3000 that satisfy the first condition is smaller than the first predetermined number, the transmission control unit 2120 selects the redundancy transmission unit 2080. The redundancy transmission unit 2080 may transmit the collection information to all the portable terminals 3000, or may transmit the collection information to some of the portable terminals 3000.

In a case where the collection information is transmitted to some of the portable terminals 3000, for example, the redundancy transmission unit 2080 preferentially selects the portable terminal 3000 that satisfies the first condition, as a target to which the collection information is transmitted. However, the redundancy transmission unit 2080 may select the portable terminal 3000 as a target to which the collection information is transmitted, without considering whether or not the first condition is satisfied.

Each of the predetermined values, such as the first predetermined number and the first reliability degree, are stored in the storage unit that is provided inside of or outside of the transmission apparatus 2000. The index value acquisition unit 2100 acquires each of the predetermined values from the storage unit. Moreover, if the transmission apparatus 2000 includes an input unit into which information is input, each of the predetermined values having been stored in the storage unit may be changed through the input unit.

<Flow for Processing>

Figure 4:
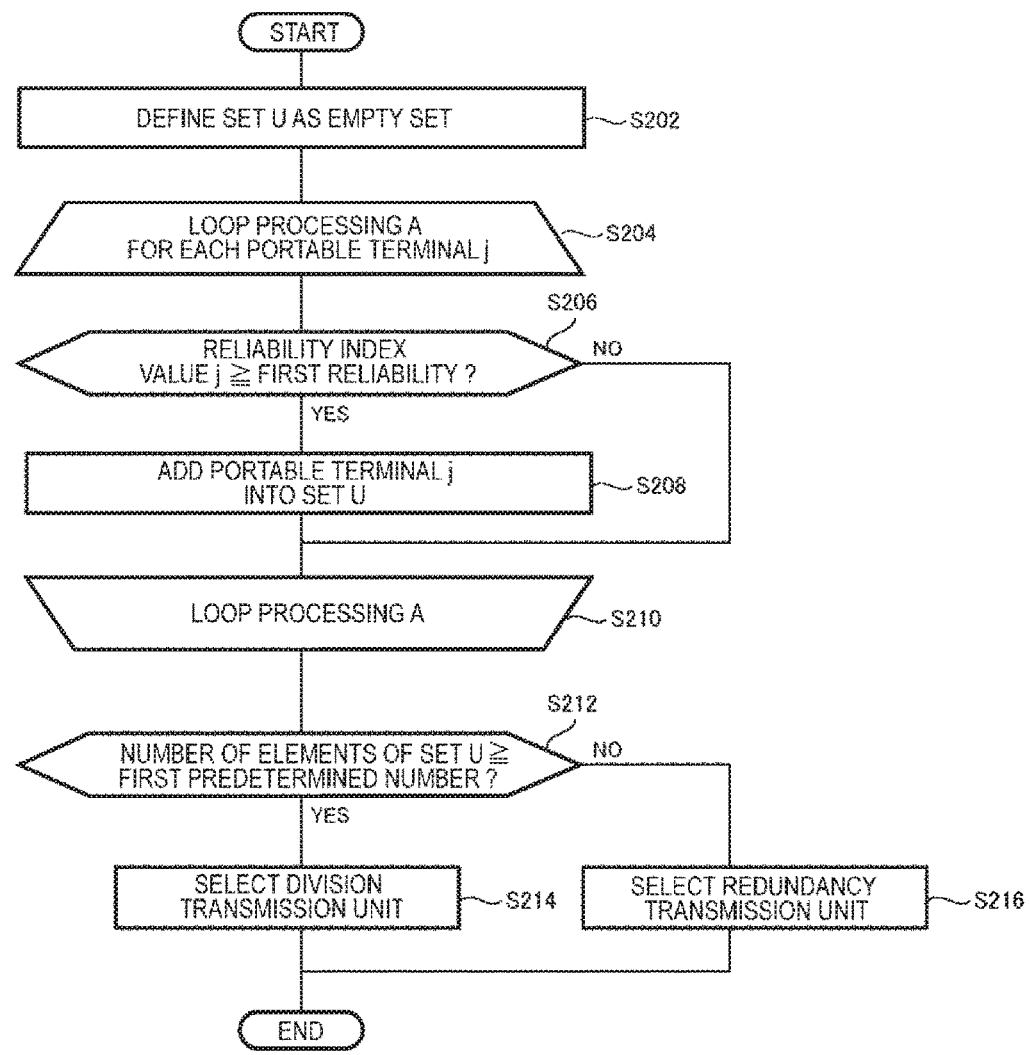
FIG. 4 is a flowchart illustrating a flow of processes performed by a transmission control unit according to a second embodiment.

FIG. 4 is a flowchart illustrating a flow of processes performed by the transmission control unit 2120 according to the second embodiment. The processing that is illustrated in the flowchart is equivalent to a concrete example of the processing that is performed in Steps S106 to S112 in FIG. 3.

In Step S202, the transmission control unit 2120 defines a set U as an empty set. The set U is a set that is used for recognizing the portable terminal 3000 that satisfies the first condition. Steps S204 to S210 is a loop processing A performed for all the portable terminals 3000. In Step S204, the transmission control unit 2120 determines whether or not the loop processing A is performed for all the portable terminals 3000.

In a case where the loop processing A was already performed for all the portable terminals 3000, processing in FIG. 4 proceeds to Step S212.

On the other hand, in a case where there exists a portable terminals 3000 that have not yet been a target for the loop processing A, the transmission control unit 2120 selects one from among the portable terminals 3000 that have not yet been the target for the loop processing A. Then, the processing in FIG. 4 proceeds to Step S206. Note that, the selected portable terminal 3000 is expressed as a portable terminal j.

In Step S206, the transmission control unit 2120 determines whether or not a reliability index value of the portable terminal j is equal to or greater than the first reliability degree. Note that, the reliability index value of the portable terminal j is expressed as a reliability index value j. In a case where the reliability index value j is equal to or greater than the first reliability degree, the processing in FIG. 4 proceeds to Step S208. On the other hand, in a case where the reliability index value of the portable terminal j is neither equal to nor greater than the first reliability degree, the processing in FIG. 4 proceeds to Step S210.

In Step S208, the transmission control unit 2120 adds the portable terminal j into the set U.

Step S210 is the end of the loop processing A. The processing in FIG. 4 returns to Step S204.

In Step S212, the transmission control unit 2120 determines whether or not the number of elements of the set U (the number of the portable terminals 3000 that satisfy the first condition) is equal to or greater than the first predetermined number. In a case where the number of the elements of the set U is equal to or greater than the first predetermined number, the processing in FIG. 4 proceeds to Step S214. On the other hand, in a case where the number of the elements of the set U is neither equal to nor greater than the first predetermined number, the processing in FIG. 4 proceeds to Step S216.

In Step S214, the transmission control unit 2120 selects the division transmission unit 2060. The division transmission unit 2060 transmits the partial collection information to the portable terminal 3000 that is included in the set U.

In Step S216, the transmission control unit 2120 selects the redundancy transmission unit 2080.

Moreover, the flow for processing performed by the transmission control unit 2120 according to the second embodiment is not limited to the flow that is illustrated in FIG. 4. For example, the transmission control unit 2120 may impose an upper limit on the number of the portable terminals 3000 that are the targets to which the division transmission unit 2060 transmits the partial collection information. In this case, for example, the transmission control unit 2120 compares the number of the elements of the set U with an upper limit number between Step S208 and S210. Then, in a case where the number of the elements of the set U is equal to the upper limit number, the loop processing A ends and Step S214 is performed. On the other hand, in a case where the processing of "the loop processing A ends and Step S214 is performed" is not performed, the transmission control unit 2120 performs Step S216.

<Advantageous Effect>

When data is transmitted to the portable terminal 3000 that has low reliability, it is possible that the data loss could occur during transmission or a portion of data could be broken. Note that, when it is necessary that each of the multiple portable terminals 3000 is able to correctly acquire the partial collection information. Thus, when the division transmission unit 2060 is used, it is preferable that each portable terminal 3000 being a transmission destination of the partial collection information has high the reliability.

With the transmission apparatus 2000 according to the present embodiment, the division transmission unit 2060 transmits the partial collection information to the portable terminal 3000 having the reliability equal to or greater than the first reliability degree, when the number of the portable terminals 3000 that have reliability equal to or greater than the first reliability degree (have high reliability) is equal to or greater than the first predetermined number. Because the partial collection information is transmitted to the portable terminal 3000 having high reliability, it is able to make higher the probability of that the partial collection information is correctly transmitted to the portable terminal 3000, and to make smaller the probability of that a problem such as the data loss occurs.

On the other hand, when the number of the portable terminals 3000 having high reliability is not sufficient (for example, one), it is preferable that the same collection information is transmitted through the multiple portable terminals 3000 in a redundant manner. When doing so, it is sufficient that at least one portable terminal 3000 among the multiple portable terminals 3000 can correctly acquire the collection information. As a result, the probability that the collection apparatus 4000 can acquire the collection information correctly is increased.

With the transmission apparatus 2000 according to the present embodiment, the redundancy transmission unit 2080 is selected when the number of the portable terminals 3000 having the reliability equal to or greater than the first reliability degree (having the high reliability) is smaller than the first predetermined number. In this manner, when the number of the portable terminals 3000 having the high reliability is not sufficient, the same collection information is transmitted to the multiple portable terminals 3000 in a redundant manner, and thus the probability that the collection apparatus 4000 can acquire the collection information correctly is increased.

Third Embodiment

A transmission apparatus 2000 according to a third embodiment is illustrated in FIG. 1 in the same manner as the transmission apparatus 2000 according to the first embodiment.

The index value acquisition unit 2100 according to the third embodiment acquires the capacity index value. The transmission control unit 2120 according to the third embodiment selects the division transmission unit 2060 or the redundancy transmission unit 2080, according to the number of the portable terminals 3000 that satisfy a second condition: "the capacity index value is equal to or greater than first capacity".

Specifically, the transmission control unit 2120 according to the third embodiment operates as follows. When the number of the portable terminals 3000 that satisfy the second condition is equal to or greater than a second predetermined number, the transmission control unit 2120 selects the redundancy transmission unit 2080. On the other hand, when the number of the portable terminals 3000 that satisfy the second condition is smaller than the second predetermined number, the transmission control unit 2120 selects the division transmission unit 2060.

For example, the division transmission unit 2060 preferentially selects the portable terminal 3000 that satisfies the second condition, as the target to which the partial collection information is transmitted. However, the division transmission unit 2060 may select the portable terminal 3000 as a target to which the partial collection information is transmitted, without considering whether or not the second condition is satisfied.

Moreover, a method of acquiring each predetermined value such as the first capacity is the same as the method of acquiring the first predetermined number and the like, which is described for the second embodiment.

<Flow for Processing>

Figure 5:
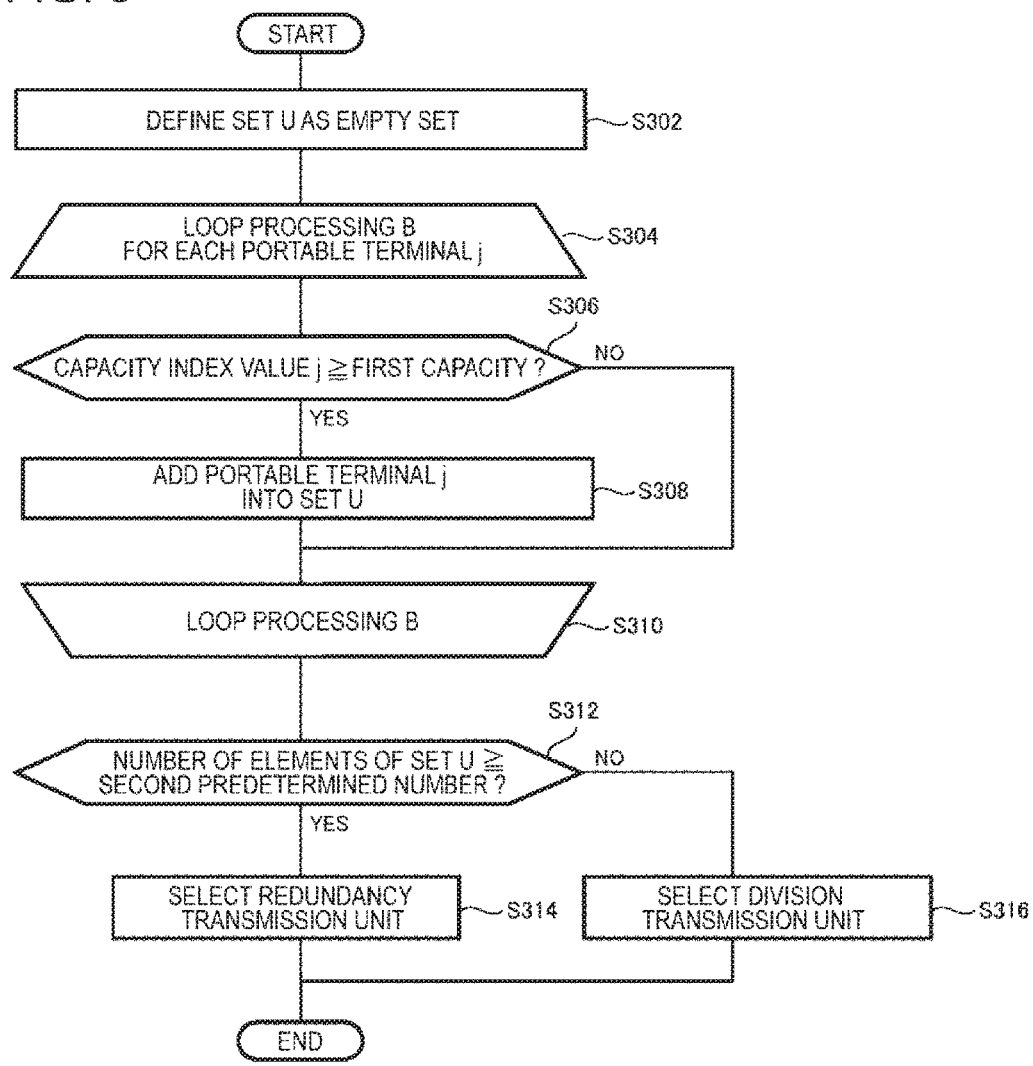
FIG. 5 is a flowchart illustrating a flow of processes performed by the transmission control unit according to a third embodiment.

FIG. 5 is a flowchart illustrating a flow of processes performed by the transmission control unit 2120 according to the third embodiment. In Step S302, the transmission control unit 2120 defines the set U as an empty set. The set U is a set to be used for recognizing the portable terminal 3000 that satisfies the second condition. Steps S304 to S310 is loop processing B that is performed for all the portable terminals 3000. In Step S304, the transmission control unit 2120 determines whether or not the loop processing B is performed for all the portable terminals 3000.

In a case where the loop processing B was already performed for all the portable terminals 3000, processing in FIG. 5 proceeds to Step S312.

On the other hand, in a case where there exists the portable terminals 3000 that have not yet been a target for the loop processing B, the transmission control unit 2120 selects one from among the portable terminals 3000 that have not yet been the target for the loop processing B. Then, the processing in FIG. 5 proceeds to Step S306. Note that, the selected portable terminal 3000 is expressed as the portable terminal j.

In Step S306, the transmission control unit 2120 determines whether or not the capacity index value of the portable terminal j equal to or greater than the first capacity. Note that, the capacity index value of the portable terminal j is expressed as a capacity index value j. In a case where the capacity index value j is equal to or greater than the first capacity, the processing in FIG. 5 proceeds to Step S308. On the other hand, in a case where the capacity index value j is neither equal to nor greater than the first capacity, the processing in FIG. 5 proceeds to Step S310.

In Step S308, the transmission control unit 2120 adds the portable terminal j into the set U.

Step S310 is the end of the loop processing B. The processing in FIG. 5 returns to Step S304.

In Step S312, the transmission control unit 2120 determines whether or not the number of the elements of the set U is equal to or greater than the second predetermined number. In a case where the number of the elements of the set U is equal to or greater than the second predetermined number, the processing in FIG. 5 proceeds to Step S314. On the other hand, in a case where the number of the elements of the set U is neither equal to nor greater than the second predetermined number, the processing in FIG. 5 proceeds to Step S316.

In Step S314, the transmission control unit 2120 selects the redundancy transmission unit 2080 and causes the redundancy transmission unit 2080 to perform the transmission. The redundancy transmission unit 2080 transmits the same collection information to the portable terminal 3000 that is included in the set U.

In Step S316, the transmission control unit 2120 selects the division transmission unit 2060 and causes the division transmission unit 2060 to perform the transmission.

Moreover, the flow for processing that is performed by the transmission control unit 2120 according to the third embodiment is not limited to the flow that is illustrated in FIG. 5. For example, the transmission control unit 2120 may impose an upper limit on the number of the portable terminals 3000 that are used by the redundancy transmission unit 2080. This method is the same as the method of imposing the upper limit on the number of the portable terminals 3000 that are the targets to which the division transmission unit 2060 transmits the partial collection information, which is described for the second embodiment.

<Advantageous Effect>

While the redundancy transmission unit 2080 transmits the collection information to each portable terminal 3000, the division transmission unit 2060 transmits the partial collection information to each portable terminal 3000. Thus, the amount of information that the redundancy transmission unit 2080 transmits to each portable terminal 3000 is greater than the amount of information that the division transmission unit 2060 transmits to each portable terminal 3000.

Note that, when the amount of information that is transmitted to the portable terminal 3000 is greater, it is required for the portable terminal 3000 to have larger capacity. When the capacity of the portable terminal 3000 is small, for example, a situation occurs where the collection information cannot be included in the receive buffer of the portable terminal 3000. As a result, the portable terminal 3000 becomes a bottleneck, and thus it takes much time to transmit the collection information to the collection apparatus 4000. Therefore, when the capacity of each of portable terminal 3000 is small, it is desirable that the division transmission unit 2060 is used and thus that the amount of information to be transmitted to each portable terminal 3000 is decreased.

Accordingly, the transmission control unit 2120 according to the present embodiment selects the redundancy transmission unit 2080, when the number of the portable terminals 3000 having a capacity index value equal to or greater than the first capacity (having large capacity) is equal to or greater than the second predetermined number. Then, the redundancy transmission unit 2080 transmits the collection information to those portable terminals 3000. On the other hand, the transmission control unit 2120 selects the division transmission unit 2060, when the number of the portable terminals 3000 having the capacity index value equal to or greater than the first capacity is smaller than the second predetermined number. In this manner, the redundancy transmission unit 2080 is used when the number of the portable terminals 3000 having large capacity is great, whereas the division transmission unit 2060 is used when the number of the portable terminals 3000 having the large capacity is small. Thus, the portable terminal 3000 having small capacity can be prevented from becoming the bottleneck and thus it is prevented from taking much time to transmit the collection information to the collection apparatus 4000. Furthermore, when the number of the portable terminals 3000 having the large capacity is great, the probability that the correct collection information is transmitted to the collection apparatus 4000 is increased because the redundancy transmission unit 2080 is used.

Fourth Embodiment

A transmission apparatus 2000 according to a fourth embodiment is illustrated in FIG. 1 in the same manner as the transmission apparatus 2000 according to the second embodiment.

The index value acquisition unit 2100 according to the fourth embodiment acquires both of the reliability index value and the capacity index value of the portable terminal 3000.

In a case where the number of the portable terminals 3000 that satisfy the first condition, which is described for the second embodiment, is smaller than the first predetermined number, the index value acquisition unit 2100 according to the fourth embodiment selects the redundancy transmission unit 2080 only when the number of the portable terminals 3000 that satisfy a third condition of "the capacity index value is equal to or greater than the second capacity" is equal to or greater than a third predetermined number. Then, the transmission control unit 2120 causes the redundancy transmission unit 2080 to transmit the same collection information to the portable terminal 3000 that satisfies the third condition.

Note that, a method of acquiring each predetermined value such as the second capacity is the same as the method of acquiring the first predetermined number or the like, which is described for the second embodiment.

<Flow for Processing>

Figure 6:
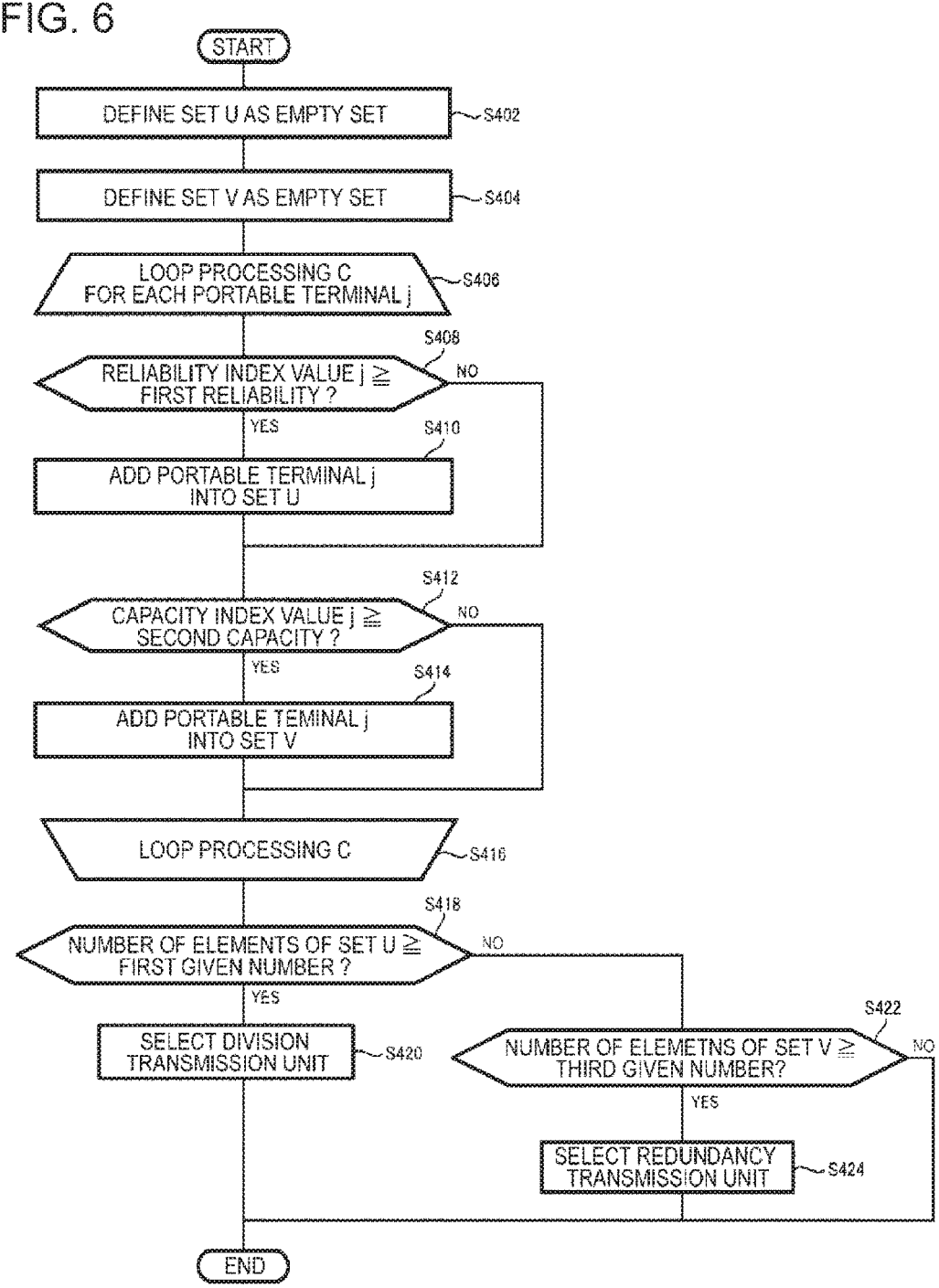
FIG. 6 is a flowchart illustrating a flow of processes performed by the transmission control unit according to a fourth embodiment.

FIG. 6 is a flowchart illustrating a flow of processes performed by the transmission control unit 2120 according to the fourth embodiment. In Step S402, the transmission control unit 2120 defines the set U as an empty set. The set U is a set to be used for recognizing the portable terminal 3000 that satisfies the first condition. In Step S404, the transmission control unit 2120 defines a set V as an empty set. The set V is a set to be used for recognizing the portable terminal 3000 that satisfies the third condition without satisfying the first condition.

Steps S406 to S416 is loop processing C performed for all the portable terminals 3000. In Step S406, the transmission control unit 2120 determines whether or not the loop processing C is performed for all the portable terminals 3000.

In a case where the loop processing C was already performed for all the portable terminals 3000, processing in FIG. 6 proceeds to Step S418.

On the other hand, in a case where there exists the portable terminals 3000 that have not yet been a target for the loop processing C, the transmission control unit 2120 selects one from among the portable terminals 3000 that have not yet been the target for the loop processing C. Then, the processing in FIG. 6 proceeds to Step S408. Note that, the selected portable terminal 3000 is expressed as the portable terminal j. Furthermore, the reliability index value and the capacity index value of the portable terminal j are expressed as the reliability index value j and the capacity index value j, respectively.

In Step S408, the transmission control unit 2120 determines whether or not the reliability index value j is equal to or greater than the first reliability degree. In the case where the reliability index value j is equal to or greater than the first reliability degree, the processing in FIG. 6 proceeds to Step S410. On the other hand, in a case where the reliability index value j is neither equal to nor greater than the first reliability degree, the processing in FIG. 6 proceeds to Step S412.

In Step S410, the transmission control unit 2120 adds the portable terminal j into the set U.

In Step S412, the transmission control unit 2120 determines whether or not the capacity index value j is equal to or greater than the second capacity. In a case where the capacity index value j is equal to or greater than the second capacity, the processing in FIG. 6 proceeds to Step S414. On the other hand, in a case where the capacity index value j is neither equal to nor greater than the second capacity, the processing in FIG. 6 proceeds to Step S416.

In Step S414, the transmission control unit 2120 adds the portable terminal j into the set V.

Step S416 is the end of the loop processing C. The processing in FIG. 6 proceeds to Step S406.

In Step S418, the transmission control unit 2120 determines whether or not the number of the elements of the set U is equal to or greater than the first predetermined number. In a case where the number of the elements of the set U is equal to or greater than the first predetermined number, the processing in FIG. 6 proceeds to Step S420. On the other hand, in a case where the number of the elements of the set U is neither equal to greater than the first predetermined number, the processing in FIG. 6 proceeds to Step S422.

In Step S420, the transmission control unit 2120 selects the division transmission unit 2060. The division transmission unit 2060 transmits the partial collection information to the portable terminal 3000 that is included in the set U.

In Step S422, the transmission control unit 2120 determines whether or not the number of elements of the set V is equal to or greater than the third predetermined number. In a case where the number of the elements of the set V is equal to or greater than the third predetermined number, the processing in FIG. 6 proceeds to Step S424. On the other hand, in a case where the number of the elements of the set V is neither equal to nor greater than the third predetermined number, the processing in FIG. 6 ends.

In Step S424, the transmission control unit 2120 selects the redundancy transmission unit 2080. The redundancy transmission unit 2080 transmits the same collection information to the portable terminal 3000 that is included in the set V.

Moreover, the flow for processing that is performed by the transmission control unit 2120 according to the fourth embodiment is not limited to the flow that is illustrated in FIG. 6. For example, the transmission control unit 2120 may impose an upper limit on the number of the portable terminals 3000 that are the targets to which the division transmission unit 2060 transmits the partial collection information, or the number of the portable terminals 3000 that are targets to which the redundancy transmission unit 2080 transmits the same collection information. This method is the same as the method of imposing the upper limit on the number of the portable terminals 3000 that are the targets to which the division transmission unit 2060 transmits the partial collection information, which is described for the second embodiment.

Furthermore, for example, in a case where the number of the elements of the set V is smaller than the third predetermined number in Step S422, the transmission control unit 2120 may again perform the processing in FIG. 6 after a certain amount of time elapses. By doing this, the collection information is transmitted using the division transmission unit 2060 or the redundancy transmission unit 2080 if the number of the portable terminals 3000 that satisfy the first condition or the third condition increases after a certain amount of time elapses.

<Advantageous Effect>

With the transmission apparatus 2000 according to the present embodiment, in the same manner as with the transmission apparatus 2000 according to the second embodiment, the division transmission unit 2060 transmits the partial collection information to the portable terminal 3000 having reliability equal to or greater than the first reliability degree, when the number of the portable terminals 3000 having a reliability index value equal to or greater than the first reliability degree (having high reliability) is equal to or greater than the first predetermined number. Because the partial collection information is transmitted to the portable terminal 3000 having high reliability, it is able to make higher the probability that the partial collection information is correctly transmitted to the portable terminal 3000, and to make smaller the probability that the problem such as the data loss occurs.

However, unlike the transmission apparatus 2000 according to the second embodiment, when the number of the portable terminals 3000 having the reliability index value equal to or greater than the first reliability degree is smaller than the first predetermined number, the transmission apparatus 2000 according to the present embodiment selects the redundancy transmission unit 2080 only when the number of the portable terminals 3000 having the capacity index value equal to or greater than the second capacity is equal to or greater than the third predetermined number. Because the collection information is larger than the partial collection information in terms of the amount of information, when the redundancy transmission unit 2080 is used, it is required for the portable terminal 3000 to have large capacity to some extent. With the transmission apparatus 2000 according to the present embodiment, the collection information is transmitted to the portable terminal 3000 having the capacity index value equal to or greater than the second capacity. Thus, the portable terminal 3000 can be prevented from becoming the bottleneck and thus it is prevented from taking much time to transmit the collection information to the collection apparatus 4000. Furthermore, the redundancy transmission unit 2080 is used, and thus the probability that the correct collection information is transmitted to the collection apparatus 4000 is increased.

Fifth Embodiment

Figure 7:
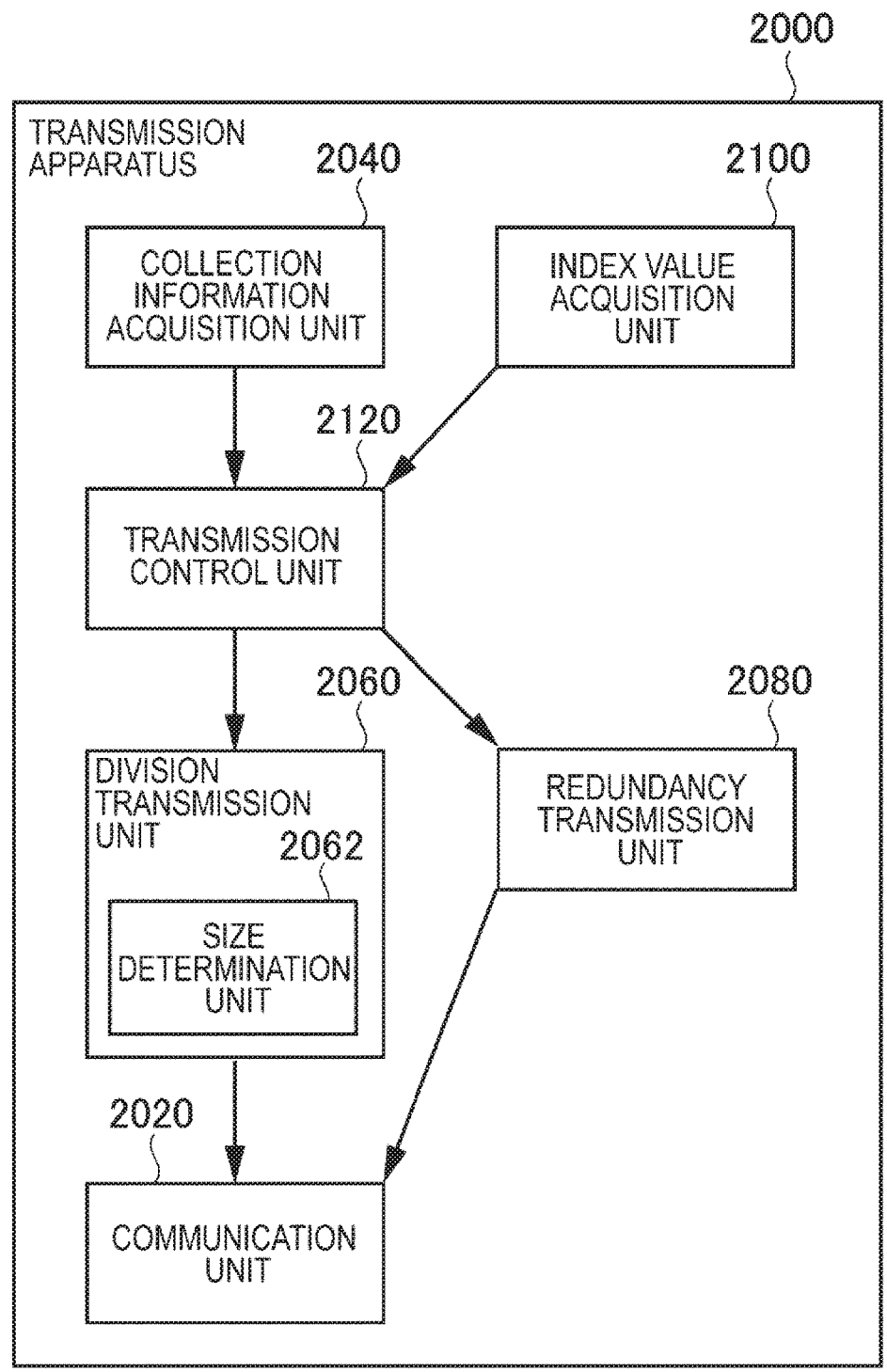
FIG. 7 is a block diagram illustrating a transmission apparatus according to a fifth embodiment, along with an operating environment thereof.

FIG. 7 is a block diagram illustrating a transmission apparatus 2000 according to a fifth embodiment, along with an operating environment thereof. In FIG. 7, the portable terminal 3000 and the collection apparatus 4000 are omitted. Note that, in FIG. 7, a flow of arrows indicates a flow of information. Furthermore, in FIG. 7, each block indicates a configuration in terms of a functional unit, not a configuration in terms of a hardware unit. Moreover, the transmission apparatus 2000 according to the fifth embodiment has the same function as the transmission apparatus 2000 according to any one of the first to fourth embodiments, except for what will be described below.

The division transmission unit 2060 according to the fifth embodiment has a size determination unit 2062. Based on any one or more of the reliability index value and the capacity index value of the portable terminal 3000, the size determination unit 2062 determines a size of the partial collection information that is transmitted to that portable terminal 3000.

For example, the size determination unit 2062 makes larger the size of the partial collection information to be transmitted, as the portable terminal 3000 has the greater capacity index value. Note that, it is considered that the larger capacity the portable terminal 3000 has, the larger the amount of information can be transmitted thereto is. Thus, the multiple portable terminals 3000 can be used with high efficiency by making larger the size of the partial collection information to be transmitted as the portable terminal 3000 has the greater capacity index value.

Furthermore, for example, the size determination unit 2062 makes larger the size of the partial collection information to be transmitted, as the portable terminal 3000 has the greater reliability index value. Generally, re-transmission of data is performed as measures against the data loss or the like. In the transmission apparatus 2000, in a case where the data loss occurs when the collection information is transmitted to the portable terminal 3000, it is also preferable that the collection information that was not correctly transmitted is re-transmitted using that portable terminal 3000 or a different portable terminal 3000. Then, in a case where the re-transmission of the data is performed in this manner, the greater the size of data is, the more time it takes to re-transmit the data. Thus, an influence of the data loss or the like is increased.

For the reason described above, it is preferable that the size of the partial collection information to be transmitted to the portable terminal 3000 having lower reliability is smaller than the size of the partial collection information to be transmitted to the portable terminal 3000 having higher reliability. Accordingly, as described above, the size determination unit 2062 makes lager the size of the partial collection information to be transmitted, as the portable terminal 3000 has the greater reliability index value.

For example, the size determination unit 2062 may determine the size of the partial collection information to be transmitted to each portable terminal 3000, taking into consideration both of the reliability index value and the capacity index value. An example of this method will be described below.

First, the size determination unit 2062 calculates X(i) for each portable terminal 3000 using Expression (1). X(i) is hereinafter expressed as a size index value of the portable terminal 3000 having an ID of i. The size index value of the portable terminal 3000 is a weighted average value of the reliability index value and the capacity index value of that portable terminal 3000. In Expression (1), R(i) and C(i) are the reliability index value and the capacity index value, respectively, of the portable terminal 3000 having the ID of i. Furthermore, α and β are weighted values that are attached to the reliability index value and the capacity index value, respectively.

[Math 1]

$$X(i) = \alpha \cdot R(i) + \beta \cdot C(i) \quad (1)$$

Additionally, the size determination unit 2062 calculates the size of the partial collection information to be transmitted to each portable terminal 3000, according to a ratio of the size index values of the portable terminals 3000, using Expression (2). A denominator on the right side of Expression (2) indicates a total of size index values of the portable terminals 3000. Furthermore, S(i) is a size of the partial collection information that is transmitted to the portable terminal 3000 having the ID of i.

[Math 2]

$$S(i) = \frac{X(i)}{\sum X(k)} \quad (2)$$

Figure 8:
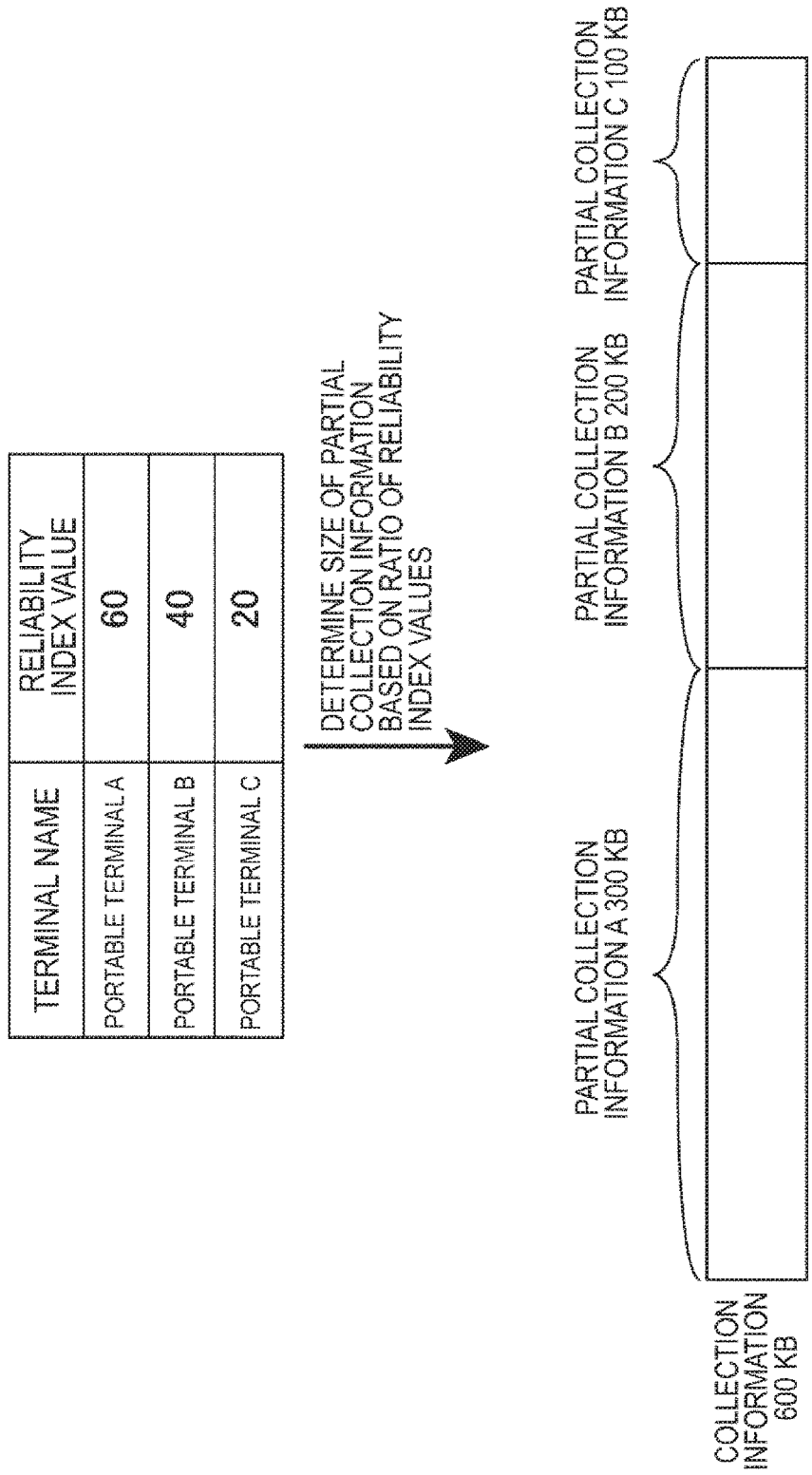
FIG. 8 is a diagram conceptually illustrating processing performed by a size determination unit according to the third embodiment.

FIG. 8 is a diagram conceptually illustrating processing performed by the size determination unit 2062 according to the third embodiment. Note that, in FIG. 8, the size determination unit 2062 makes a ratio of the sizes of the pieces of partial collection information to be transmitted to each portable terminal 3000 equal to a ratio of the reliability index values of the portable terminals 3000.

Specifically, in FIG. 8, reliability index values of three portable terminals 3000 (a portable terminal A, a portable terminal B, and a portable terminal C) are 60, 40, and 20, respectively. Furthermore, the size of the partial collection information is 600 KB.

In this example, a ratio of the reliability index values of the portable terminals A to C is 3:2:1. Accordingly, the size determination unit 2062 sets as 3:2:1 the ratio of the sizes of the pieces of partial collection information to be transmitted respectively to the portable terminals A to C. Therefore, the size determination unit 2062 sets the sizes of pieces of partial collection information A to C to be transmitted to the portable terminals A to C as 300 KB, 200 KB, and 100 KB, respectively.

The embodiments of the present invention are described above referring to the drawings, but these are merely examples of the present invention. Combinations of the embodiments described above, and various configurations other than those according to the embodiment described above can be employed.

This application claims priority to Japanese Patent Application No. 2013-237599, filed on Nov. 18, 2013, the contents of which is incorporated by reference herein in its entirety.

The invention claimed is:

1. A transmission apparatus transmitting collection information to a collection apparatus through multiple portable terminals, comprising:
   a communication unit performing directly wireless communication with a portable terminal;
   a collection information acquisition unit acquiring the collection information;
   a division transmission unit generating multiple pieces of partial collection information by dividing the collection information, and transmitting pieces of partial collection information being different from each other to the multiple portable terminals using the communication unit;
   a redundancy transmission unit transmitting same collection information to the multiple portable terminals using the communication unit;
   an index value acquisition unit acquiring any one or two of a reliability index value and a capacity index value for the portable terminal, the reliability index value indicating reliability of communication being performed between the portable terminal and the transmission apparatus, the capacity index value indicating capacity of the portable terminal; and
   a transmission control unit selecting either of the division transmission unit or the redundancy transmission unit, based on any one or two of the reliability index value and the capacity index value of the portable terminal, and causing the selected unit to perform the transmission of the collection information.

2. The transmission apparatus according to claim 1,
wherein the transmission control unit selects the division transmission unit and causes the partial collection information to be transmitted to the portable terminals that satisfy a first condition, when a number of the portable terminals that satisfy the first condition is equal to or greater than a first predetermined number, the first condition being that the reliability index value is equal to or greater than a first reliability degree, and
wherein the transmission control unit selects the redundancy transmission unit and causes the redundancy transmission unit to transmit the same collection information, when the number of the portable terminals that satisfy the first condition is smaller than the first predetermined number.

3. The transmission apparatus according to claim 2,
wherein, in a case where the number of the portable terminals that satisfy the first condition is smaller than the first predetermined number, the transmission control unit selects the redundancy transmission unit and causes the same collection information to be transmitted to the portable terminals that satisfy a third condition only when the number of the portable terminals that satisfy the third condition is equal to or greater than a third predetermined number, the third condition being that the capacity index value is equal to or greater than a second capacity.

4. The transmission apparatus according to claim 1,
wherein the transmission control unit selects the redundancy transmission unit and causes the collection information to be transmitted to the portable terminal that satisfies a second condition, when a number of the portable terminals that satisfy the second condition is equal to or greater than a second predetermined number, the second condition being that the capacity index value is equal to or greater than a first capacity, and
wherein the transmission control unit selects the division transmission unit and causes the division transmission unit to transmit the pieces of partial collection information, when the number of the portable terminals that satisfy the second condition is smaller than the second predetermined number.

5. The transmission apparatus according to claim 1,
wherein, based on any one or two of the reliability index value and the capacity index value of a portable terminal, the division transmission unit determines a size of the partial collection information to be transmitted to the portable terminal.

6. The transmission apparatus according to claim 1,
wherein as a radio wave intensity between the portable terminal and the transmission apparatus becomes higher, the reliability index value of the portable terminal becomes greater.

7. The transmission apparatus according to claim 1,
wherein as a communication speed between the portable terminal and the transmission apparatus becomes higher or as the amount of information that the portable terminal is able to receive from the transmission apparatus becomes greater, a size of the capacity index value of the portable terminal becomes greater.

8. The transmission apparatus according to claim 1,
wherein the reliability index value indicates: a higher value as radio wave intensity between the portable terminal and the transmission apparatus is higher; or a higher value as correct transfer of the collection information is frequently occurred due to data losses when the collection information is transmitted to the portable terminal from the transmission apparatus,
wherein the capacity index value indicates: a higher value as a communication speed between the portable terminal and the transmission apparatus is higher; or a higher value as an amount of information that the portable terminal can receive from the transmission apparatus is greater.

9. A control method that is performed by a computer that transmits collection information to a collection apparatus through multiple portable terminals, the computer including a communication unit performing directly wireless communication with a portable terminal, the control method comprising:
acquiring the collection information;
generating multiple pieces of partial collection information by dividing the collection information, and transmitting pieces of partial collection information being different from each other to the multiple portable terminals using the communication unit;
transmitting same collection information to the multiple portable terminals using the communication unit;
acquiring any one or two of a reliability index value and a capacity index value for the portable terminal, the reliability index value indicating reliability of communication being performed between the portable terminal and the transmission apparatus, the capacity index value indicating capacity of the portable terminal; and
selecting either of the step of generating multiple pieces of partial collection and transmitting pieces of partial collection information or the step of transmitting the same collection information, based on any one or two of the reliability index value and the capacity index value of the portable terminal, and causing the selected step to be performed on the collection information.

10. The control method according to claim 9,
wherein, in the step of the selection, the step of generating multiple pieces of partial collection and transmitting pieces of partial collection information is selected and the partial collection information is caused to be transmitted to the portable terminals that satisfy a first condition, when a number of the portable terminals that satisfy the first condition is equal to or greater than a first predetermined number, the first condition being that the reliability index value is equal to or greater than a first reliability degree, and
wherein, in the step of the selection, the step of transmitting the same collection information is selected and the same collection information is caused to be transmitted, when the number of the portable terminals that satisfy the first condition is smaller than the first predetermined number.

11. The control method according to claim 10,
wherein, in the step of the selection, in a case where the number of the portable terminals that satisfy the first condition is smaller than the first predetermined number, the step of transmitting the same collection information is selected and the same collection information is caused to be transmitted to the portable terminal that satisfies a third condition only when the number of the portable terminals that satisfy the third condition is equal to or greater than a third predetermined number, the third condition being that the capacity index value is equal to or greater than a second capacity.

12. The control method according to claim 9,
wherein, in the step of the selection, the step of transmitting the same collection information is selected and the collection information is caused to be transmitted to the portable terminals that satisfy a second condition, when a number of the portable terminals that satisfy a second condition is equal to or greater than a second predetermined number, the second condition being that the capacity index value is equal to or greater than a first capacity, and
wherein, in the step of the selection, the step of generating multiple pieces of partial collection and transmitting pieces of partial collection information is selected and the pieces of partial collection information is caused to be transmitted, when the number of the portable terminals that satisfy the second condition is smaller than the second predetermined number.

13. The control method according to claim 9,
wherein, in the step of generating multiple pieces of partial collection and transmitting pieces of partial collection information, a size of the partial collection information to be transmitted to the portable terminal is determined based on any one or two of the reliability index value and the capacity index value of the portable terminal.

14. The control method according to claim 9,
wherein as a radio wave intensity between the portable terminal and the computer becomes higher, the reliability index value of the portable terminal becomes greater.

15. The control method according to claim 9,
wherein as a communication speed between the portable terminal and the computer becomes higher or as the amount of information that the portable terminal is able to receive from the computer becomes greater, a size of the capacity index value of the portable terminal becomes greater.

16. A computer-readable storage medium storing a program that causes a computer to have a function of operating as a transmission apparatus that transmits collection information to a collection apparatus through multiple portable terminals, the computer including a communication unit that performing directly wireless communication with a portable terminal, the program causing the computer to execute:
acquiring the collection information;
generating multiple pieces of partial collection information by dividing the collection information, and transmitting pieces of partial collection information being different from each other to the multiple portable terminals using the communication unit;
transmitting same collection information to the multiple portable terminals using the communication unit;
acquiring any one or two of a reliability index value and a capacity index value for the portable terminal, the reliability index value indicating reliability of communication being performed between the portable terminal and the transmission apparatus, the capacity index value indicating capacity of the portable terminal; and
selecting either of the step of generating multiple pieces of partial collection and transmitting pieces of partial collection information or the step of transmitting the same collection information, based on any one or two of the reliability index value and the capacity index value of the portable terminal, and causing the selected step to be performed on the collection information.

17. The computer-readable storage medium according to claim 16,
wherein, in the step of the selection, the step of generating multiple pieces of partial collection and transmitting pieces of partial collection information is selected and the partial collection information is caused to be transmitted to the portable terminals that satisfy a first condition, when a number of the portable terminals that satisfy the first condition is equal to or greater than a first predetermined number, the first condition being that the reliability index value is equal to or greater than a first reliability degree, and
wherein, in the step of the selection, the step of transmitting the same collection information is selected and the same collection information is caused to be transmitted, when the number of the portable terminals that satisfy the first condition is smaller than the first predetermined number.

18. The computer-readable storage medium according to claim 17,
wherein, in the step of the selection, in a case where the number of the portable terminals that satisfy the first condition is smaller than the first predetermined number, the step of transmitting the same collection information is selected and the same collection information is caused to be transmitted to the portable terminal that satisfies a third condition only when the number of the portable terminals that satisfy the third condition is equal to or greater than a third predetermined number, the third condition being that the capacity index value is equal to or greater than a second capacity.

19. The computer-readable storage medium according to claim 16,
wherein, in the step of the selection, the step of transmitting the same collection information is selected and the collection information is caused to be transmitted to the portable terminals that satisfy a second condition, when a number of the portable terminals that satisfy a second condition is equal to or greater than a second predetermined number, the second condition being that the capacity index value is equal to or greater than a first capacity, and
wherein, in the step of the selection, the step of generating multiple pieces of partial collection and transmitting pieces of partial collection information is selected and the pieces of partial collection information is caused to be transmitted, when the number of the portable terminals that satisfy the second condition is smaller than the second predetermined number.

20. The computer-readable storage medium according to claim 16,
wherein, in the step of generating multiple pieces of partial collection and transmitting pieces of partial collection information, a size of the partial collection information to be transmitted to a portable terminal is determined based on any one or two of the reliability index value and the capacity index value of the portable terminal.

21. The computer-readable storage medium according to claim 16,
wherein as a radio wave intensity between the portable terminal and the computer becomes higher, the reliability index value of the portable terminal becomes greater.

22. The computer-readable storage medium according to claim 16,
wherein as a communication speed between the portable terminal and the computer becomes higher or as the amount of information that the portable terminal is able to receive from the computer becomes greater, a size of the capacity index value of the portable terminal becomes greater.

\* \* \* \* \*